(12) United States Patent
Ishii et al.

(10) Patent No.: US 12,437,400 B2
(45) Date of Patent: Oct. 7, 2025

(54) MEDICAL IMAGE ABNORMALITY DETECTION SYSTEM AND ABNORMALITY DETECTION METHOD

(71) Applicant: Panasonic Holdings Corporation, Osaka (JP)

(72) Inventors: Masahiro Ishii, Kanagawa (JP); Kenji Kondo, Fukui (JP); Masato Tanaka, Fukui (JP); Shinichi Fujimoto, Fukui (JP)

(73) Assignee: PANASONIC HOLDINGS CORPORATION, Osaka (JP)

( * ) Notice: Subject to any disclaimer, the term of this patent is extended or adjusted under 35 U.S.C. 154(b) by 335 days.

(21) Appl. No.: 18/200,693

(22) Filed: May 23, 2023

(65) Prior Publication Data

US 2023/0289965 A1    Sep. 14, 2023

Related U.S. Application Data

(63) Continuation of application No. PCT/JP2021/041902, filed on Nov. 15, 2021.

(30) Foreign Application Priority Data

Nov. 25, 2020   (JP) .................. 2020-195390

(51) Int. Cl.
*G06T 7/00*    (2017.01)
(52) U.S. Cl.
CPC .................. *G06T 7/0012* (2013.01)
(58) Field of Classification Search
CPC ......... G06T 7/0012; G06T 2207/10072; G06T 2207/10116; G06T 2207/10132;
(Continued)

(56) References Cited

U.S. PATENT DOCUMENTS

| 5,615,243 A | 3/1997 | Chang et al. |
| 9,589,374 B1 | 3/2017 | Gao et al. |

(Continued)

FOREIGN PATENT DOCUMENTS

| JP | 2019-530488 | 10/2019 |
| WO | 2010/087112 | 8/2010 |

(Continued)

OTHER PUBLICATIONS

International Search Report (ISR) issued on Jan. 18, 2022 in International (PCT) Application No. PCT/JP2021/041902.

(Continued)

*Primary Examiner* — Shefali D Goradia
(74) *Attorney, Agent, or Firm* — Wenderoth, Lind & Ponack, L.L.P.

(57) ABSTRACT

An abnormality detection system is a system that detects, based on a medical image, whether a prespecified anatomical structure included in the medical image is abnormal, and includes: an obtainer that obtains block information indicating one or more blocks that are each a region in which pixels representing the anatomical structure are connected in the medical image; and a determiner that determines and outputs whether the anatomical structure is abnormal, based on the number of blocks indicated by the block information obtained by the obtainer, wherein the determiner determines that the anatomical structure is not abnormal when the number of blocks indicated by the block information is 1, and determines that the anatomical structure is abnormal when the number of blocks indicated by the block information is 2 or more and the two or more blocks indicated by the block information satisfy a predetermined condition.

6 Claims, 12 Drawing Sheets

(58) Field of Classification Search
CPC .......... G06T 2207/30004; A61B 6/463; A61B 6/468; A61B 6/03; A61B 6/032; A61B 6/037; A61B 6/5217; A61B 8/463; A61B 8/468; A61B 8/5223; G06V 2201/031; G06V 10/457; G06V 10/50; G16H 30/20; G16H 30/40; G16H 40/67; G16H 50/70
See application file for complete search history.

(56) References Cited

U.S. PATENT DOCUMENTS

| | | | |
|---|---|---|---|
| 10,691,980 B1* | 6/2020 | Guendel | G06T 7/70 |
| 2007/0274578 A1* | 11/2007 | Doi | G06T 7/0012 |
| | | | 382/128 |
| 2009/0016491 A1* | 1/2009 | Li | G16H 50/20 |
| | | | 378/98.5 |
| 2011/0144482 A1* | 6/2011 | Sendai | G06T 7/0012 |
| | | | 600/425 |
| 2011/0274340 A1 | 11/2011 | Suzuki et al. | |
| 2015/0146855 A1* | 5/2015 | Futamura | A61B 8/4416 |
| | | | 378/63 |

FOREIGN PATENT DOCUMENTS

| WO | WO-2017011532 A1 * | 1/2017 | ............ G06V 10/42 |
|---|---|---|---|
| WO | 2018/026431 | 2/2018 | |

OTHER PUBLICATIONS

Extended European Search Report issued Dec. 21, 2023 in corresponding European Patent Application No. 21897775.9.

\* cited by examiner

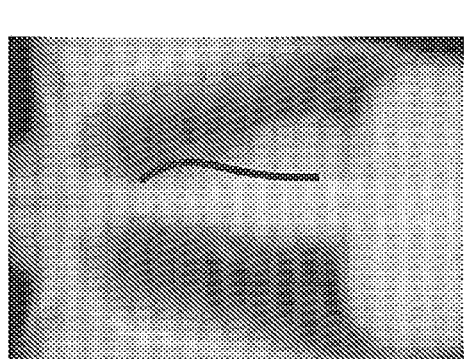

FIG. 2C

| Chest X-ray image | Anatomical structure name | Anatomical structure region | Superimposition of chest X-ray image and anatomical structure |
|---|---|---|---|
| | Right diaphragmatic dome shadow | | |
| | Left diaphragmatic dome shadow | | |

| Chest X-ray image | Anatomical structure name | Anatomical structure region | Superimposition of chest X-ray image and anatomical structure |
|---|---|---|---|
|  | Right lateral lung shadow |  |  |
|  | Left lateral lung shadow |  | |

(a)

(b)

(c)

(d)

MEDICAL IMAGE ABNORMALITY DETECTION SYSTEM AND ABNORMALITY DETECTION METHOD

CROSS REFERENCE TO RELATED APPLICATIONS

This is a continuation application of PCT International Application No. PCT/JP2021/041902 filed on Nov. 15, 2021, designating the United States of America, which is based on and claims priority of Japanese Patent Application No. 2020-195390 filed on Nov. 25, 2020. The entire disclosures of the above-identified applications, including the specifications, drawings and claims are incorporated herein by reference in their entirety.

FIELD

The present disclosure relates to a medical image abnormality detection system and abnormality detection method, and particularly to a system, etc. that detect whether an anatomical structure included in a medical image is abnormal.

BACKGROUND

Techniques of detecting whether anatomical structures such as organs are abnormal based on medical images are conventionally proposed (see, for example, Patent Literature (PTL) 1). In PTL 1, image segmentation is performed on a medical image to separate a region of interest from the medical image, and whether there is an abnormality is determined based on the barycentric position, volume, shape, intensity, density, transparency, etc. of the separated region of interest. In this specification, the terms "abnormal" and "normal" mean "abnormal" and "normal" from the medical perspective (i.e. from the diagnostic perspective).

CITATION LIST

Patent Literature

PTL 1: Japanese Unexamined Patent Application Publication (Translation of PCT Application) No. 2019-530488

SUMMARY

Technical Problem

With the method that uses the characteristics of the region of interest separated by image segmentation as in PTL 1, for example, it may be impossible to distinguish an abnormal case when, in a medical image, an abnormality such as a tumor or water overlaps part of a normal structure of an organ, In view of this, the present disclosure has an object of providing a medical image abnormality detection system and abnormality detection method capable of detecting whether an anatomical structure is abnormal with higher accuracy.

Solution to Problem

To achieve the object stated above, a medical image abnormality detection system according to an aspect of the present disclosure is an abnormality detection system that detects, based on a medical image, whether a prespecified anatomical structure included in the medical image is abnormal, the abnormality detection system including: an obtainer that obtains block information indicating one or more blocks that are each a region in which pixels representing the anatomical structure are connected in the medical image; and a determiner that determines and outputs whether the anatomical structure is abnormal, based on a total number of the one or more blocks indicated by the block information obtained by the obtainer, wherein the determiner determines that the anatomical structure is not abnormal when the total number of the one or more blocks indicated by the block information is 1, and determines that the anatomical structure is abnormal when the total number of the one or more blocks indicated by the block information is 2 or more and the two or more blocks indicated by the block information satisfy a predetermined condition.

To achieve the object stated above, a medical image abnormality detection method according to an aspect of the present disclosure is an abnormality detection method executed by an abnormality detection system that detects, based on a medical image, whether a prespecified anatomical structure included in the medical image is abnormal, the abnormality detection method including: obtaining block information indicating one or more blocks that are each a region in which pixels representing the anatomical structure are connected in the medical image; and determining and outputting whether the anatomical structure is abnormal, based on a total number of the one or more blocks indicated by the block information obtained in the obtaining, wherein in the determining, the anatomical structure is determined to be not abnormal when the total number of the one or more blocks indicated by the block information is 1, and determined to be abnormal when the total number of the one or more blocks indicated by the block information is 2 or more and the two or more blocks indicated by the block information satisfy a predetermined condition.

Advantageous Effects

According to the present disclosure, it is possible to provide a medical image abnormality detection system and abnormality detection method capable of detecting whether an anatomical structure is abnormal with higher accuracy.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 2A is a diagram illustrating an example of an anatomical structure in a medical image.

FIG. 2B is a diagram illustrating another example of an anatomical structure in a medical image.

FIG. 2C is a diagram illustrating another example of an anatomical structure in a medical image.

DESCRIPTION OF EMBODIMENTS

Embodiments of the present disclosure will be described in detail below, with reference to the drawings. The embodiments described below each show a specific example according to the present disclosure. The numerical values, shapes, materials, structural elements, the arrangement and connection of the structural elements, steps, the order of steps, etc. shown in the following embodiments are mere examples, and do not limit the scope of the present disclosure. Each drawing does not necessarily provide precise depiction. The substantially same structural elements are given the same reference signs throughout the drawings, and repeated description is omitted or simplified.

Figure 1:
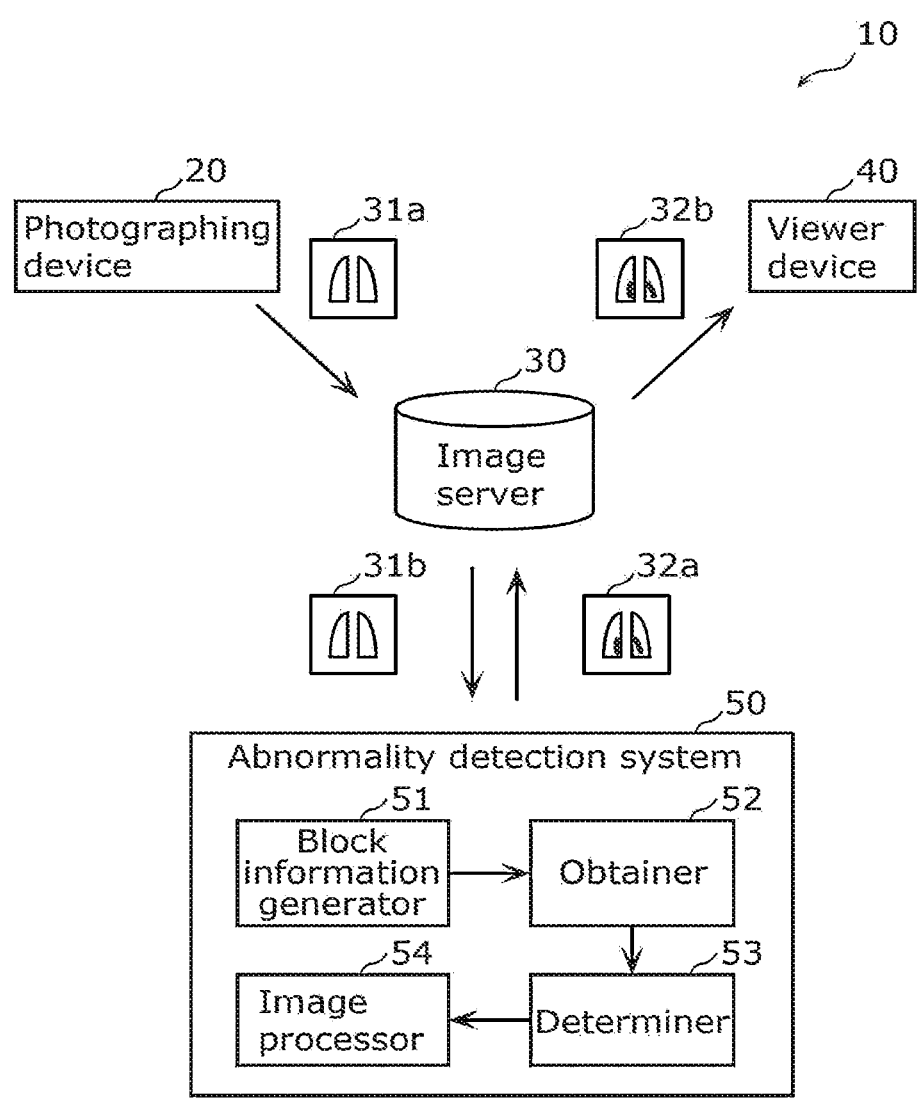
FIG. 1 is a block diagram illustrating the structure of a diagnosis support system according to an embodiment.

FIG. 1 is a block diagram illustrating the structure of diagnosis support system 10 according to an embodiment. Diagnosis support system 10 is a system that assists doctors in efficiently diagnosing anatomical structures based on medical images, and includes photographing device 20, image server 30, viewer device 40, and abnormality detection system 50 connected via a communication channel such as the Internet.

Photographing device 20 is a device that generates medical image 31a by photographing an anatomical structure of a person. In this embodiment, photographing device 20 is an X-ray photographing device that generates a chest X-ray image as a medical image and stores it in image server 30. Medical images are not limited to chest X-ray images, and may be X-ray images of other parts, and may be images provided by CT scan, PET/CT scan, SPECT scan, MRI, ultrasound, X-ray, mammography, angiography, fluorography, photomicrography, or any combination thereof.

Image server 30 is a data server that holds medical image 31a generated by photographing device 20 and medical image 32a after detection generated by abnormality detection system 50 and provides medical image 32b held therein to viewer device 40. For example, image server 30 is a computer device including a storage such as a hard disk. Data which image server 30 transmits to and received from other devices may include not only medical images but also various information (photographing date and time, patient information, detection results, etc.) accompanying the medical images.

Viewer device 40 is a device that displays, in any of various forms, medical image 32b and various information accompanying the medical image held in image server 30, according to an instruction by a user obtained via a graphical user interface (GUI). For example, viewer device 40 is a computer device including peripherals such as a display, an input device such as a mouse, and a storage device such as a hard disk.

Abnormality detection system 50 is a system that detects, based on medical image 31b as the detection target obtained from image server 30, whether a prespecified anatomical structure included in the medical image has a medical abnormality, and includes block information generator 51, obtainer 52, determiner 53, and image processor 54.

Block information generator 51 generates, from medical image 31b as the detection target obtained from image server 30, block information indicating one or more blocks that are each a region in which pixels representing the anatomical structure included in medical image 31b are connected. That is, block information generator 51 performs labeling on medical image 31b to separate it into image blocks. The block information is not limited to a specific format as long as it is information specifying each individual block in medical image 31b. For example, the block information may be information distinguishing the pixels belonging to each individual block from the other pixels in medical image 31b (for example, a binary image in which the pixels constituting the block are set to "1" and the other pixels are set to "0"), or information indicating the characteristics of each individual block (for example, the area, contour information, etc, of the block obtained by analyzing the foregoing binary image), Obtainer 52 obtains the block information generated by block information generator 51.

Determiner 53 determines and outputs whether the anatomical structure included in medical image 31b is abnormal, based on the number of blocks indicated by the block information obtained by obtainer 52. In the case where the number of blocks indicated by the block information is 1, determiner 53 recognizes that the anatomical structure that is supposed to be detected as one block is detected as one block, and determines that the anatomical structure included in medical image 31b is not abnormal. In the case where the number of blocks indicated by the block information is 2 or more and the blocks indicated by the block information satisfy a predetermined condition, determiner 53 determines that the anatomical structure that is supposed to be detected as one block is separated into two or more blocks not because of noise on the image or image processing, and determines that the anatomical structure included in medical image 31b is abnormal.

For example, the predetermined condition is a condition relating to a block with the second largest area in medical image 31b out of the two or more blocks indicated by the block information. In more detail, the predetermined condition is that the block with the second largest area in medical image 31b out of the two or more blocks indicated by the block information has an area greater than or equal to a first threshold.

For example, the predetermined condition is a condition that the minimum value of the distance in medical image 31b between a block with the largest area in medical image 31b and each other block out of the two or more blocks indicated by the block information is less than or equal to a second threshold. Here, the predetermined condition may further include a condition that the block with the second largest area in medical image 31b out of the two or more blocks indicated by the block information has an area greater than or equal to the first threshold.

Image processor 54 reflects the determination result of determiner 53 on medical image 31b as the detection target to thus generate medical image 32a after the detection, and stores it in image server 30.

Specifically, block information generator 51, obtainer 52, determiner 53, and image processor 54 included in abnormality detection system 50 are implemented by at least one computer that includes nonvolatile memory holding programs, volatile memory as a temporary work area, a processor executing programs, input/output circuitry including communication interfaces and communication ports, and the like.

Block information generator 51, obtainer 52, determiner 53, and image processor 54 included in abnormality detection system 50 may be implemented by one computer or image processing device, or implemented in a distributed manner by a plurality of computers or image processing devices connected by a communication channel, Although photographing device 20, image server 30, viewer device 40, and abnormality detection system 50 are connected via a communication channel in diagnosis support system 10, some or all of these structural elements may be assembled as one device.

Abnormality detection system 50 need not necessarily include block information generator 51 and image processor 54, as long as it includes at least obtainer 52 and determiner 53. Even with such a structure, it is possible to detect whether the anatomical structure included in the medical image is abnormal. Abnormality detection system 50 may include the function of at least one of photographing device 20, image server 30, and viewer device 40.

FIGS. 2A to 2D are diagrams illustrating examples of anatomical structures (included) in medical images (examples of seven types of anatomical structures in total). In more detail, FIGS. 2A to 2D respectively illustrate the right atrial and left ventricular shadows, the descending aortic shadow, the right and left diaphragmatic dome shadows, and the right and left lateral lung shadows, as examples of anatomical structures. In the table of each of FIGS. 2A to 2D, a chest X-ray image, an anatomical structure name, an anatomical structure region, and an example of superimposition of the chest X-ray image and the anatomical structure are illustrated from left to right.

Examples of anatomical structures on chest X-ray images include the right atrial shadow, the left ventricular shadow, the descending aortic shadow, and the diaphragmatic dome shadows, as illustrated in FIGS. 2A to 2C. The right atrial shadow is the boundary The drawn at the boundary between the right atrium and its surroundings on the chest X-ray image. The left ventricular shadow is the boundary line drawn at the boundary between the left ventricle and its surroundings on the chest X-ray image, The descending aortic shadow is the boundary line drawn at the boundary between the descending aorta and its surroundings on the chest X-ray image, The diaphragmatic dome shadow is the boundary line drawn at the boundary between the diaphragm and its surroundings on the chest X-ray image.

Figure 2D:
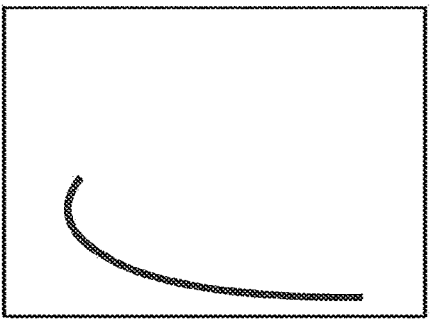
FIG. 2D is a diagram illustrating another example of an anatomical structure in a medical image.
Figure 2D:
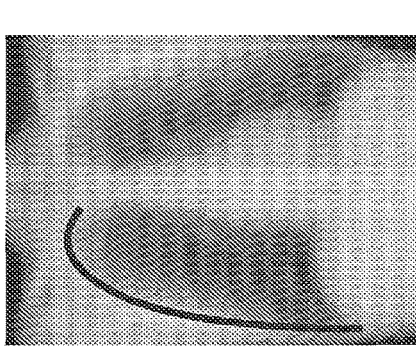
Figure 2D:
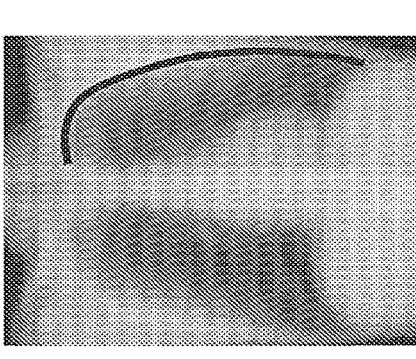
Figure 2D:
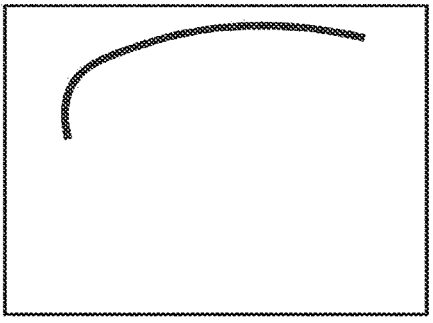
Figure 2D:
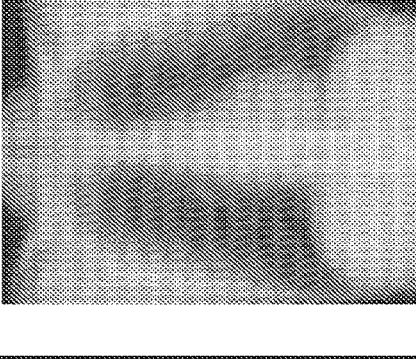

Anatomical structures on chest X-ray images are not limited to such. Other examples of anatomical structures include the lung outer edge shadow which is the boundary line drawn at the boundary between the outer portion of the lung and its surroundings on the chest X-ray image as illustrated in FIG. 2D, and other structures and shadows of organs. Anatomical structures are not limited to structures included in chest X-ray images, and may be structures included in medical images taken with other photographing devices, such as CT images and MRI images.

The operation of diagnosis support system 10 according to this embodiment with the above-described structure will be described below, focusing on the operation of abnormality detection system 50 characteristic in diagnosis support system 10.

Figure 3:
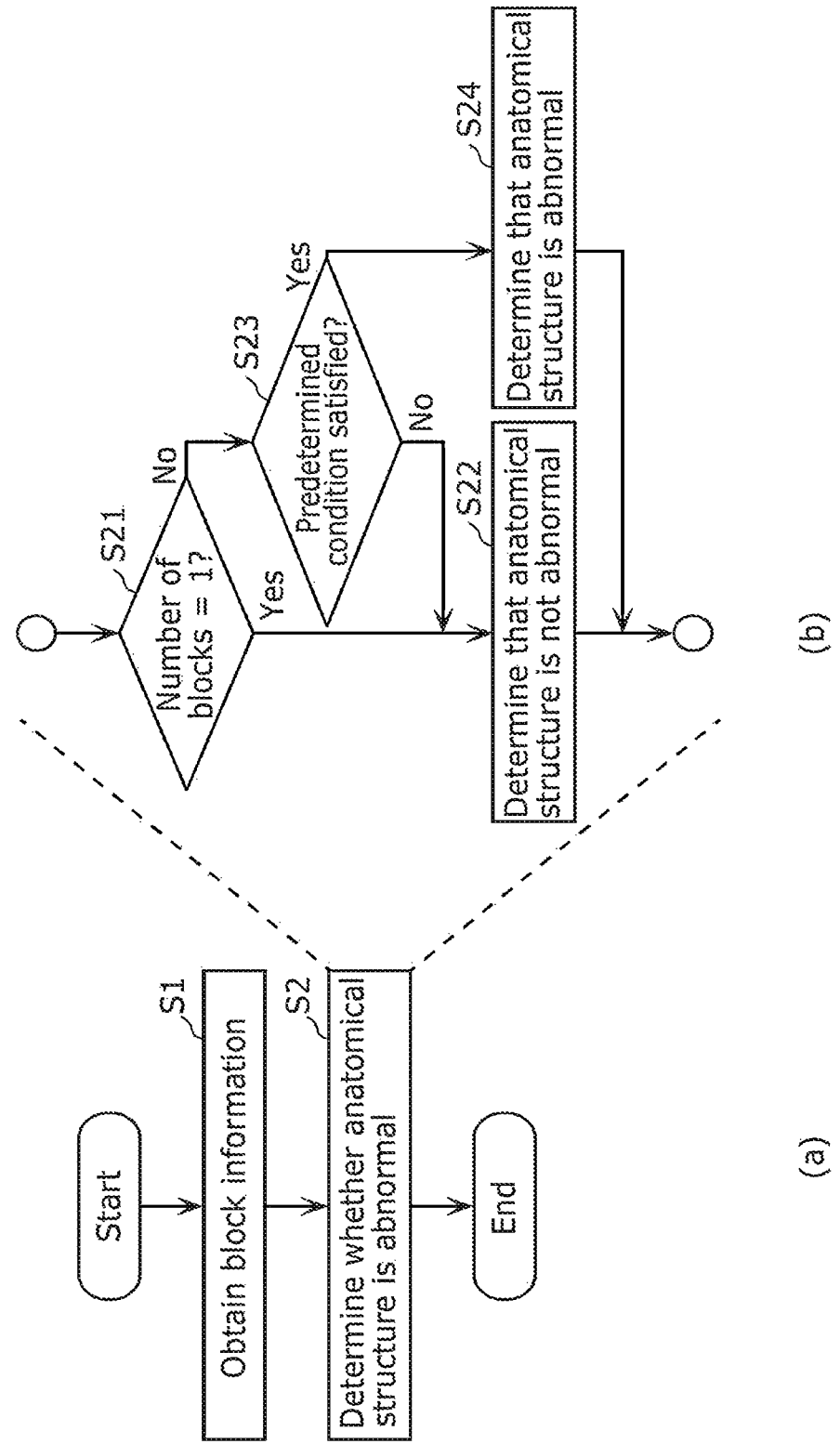
FIG. 3 is a flowchart illustrating the main operation of an abnormality detection system in FIG. 1.

FIG. 3 is a flowchart illustrating the main operation of abnormality detection system 50 in FIG. 1 (i.e. abnormality detection method). (a) in FIG. 3 illustrates the flow of the main operation of abnormality detection system 50, and (b) in FIG. 3 illustrates the details of Step S2 in (a) in FIG. 3.

First, obtainer 52 obtains block information generated by block information generator 51 (obtainment step S1).

Next, determiner 53 determines and outputs whether the anatomical structure included in the medical image is abnormal, based on the number of blocks indicated by the block information obtained by obtainer 52 (determination step S2). In more detail, determiner 53 determines the number of blocks indicated by the block information (521). In the case where the number of blocks is 1 (521: Yes), determiner 53 recognizes that the anatomical structure that is supposed to be detected as one block is detected as one block, and determines that the anatomical structure included in the medical image is not abnormal (522), In the case where the number of blocks indicated by the block information is 2 or more, determiner 53 determines whether the blocks indicated by the block information satisfy a predetermined condition (S23). In the case where the predetermined condition is satisfied (Yes in S23), determiner 53 recognizes that the anatomical structure that is supposed to be detected as one block is separated into two or more blocks not because of noise on the image or image processing, and determines that the anatomical structure included in the medical image is abnormal (S24). In the case where the predetermined condition is not satisfied (S23: No), determiner 53 recognizes that the anatomical structure that is supposed to be detected as one block is separated into two or more blocks because of noise on the image or image processing, and determines that the anatomical structure included in the medical image is not abnormal (S22).

Figure 4:
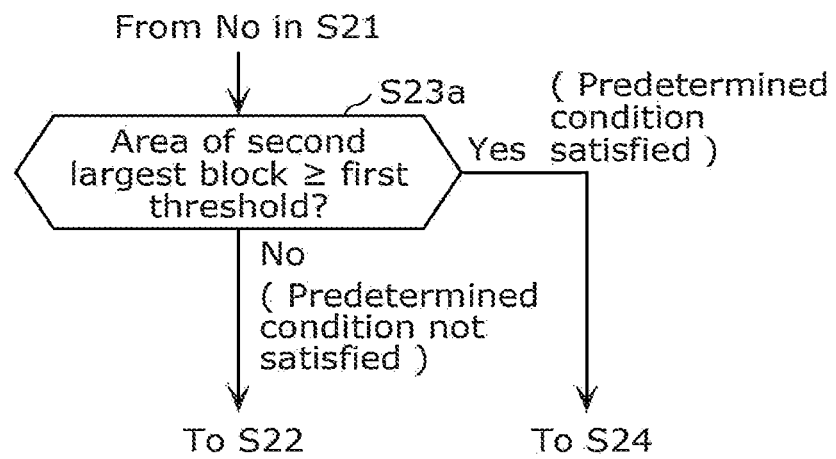
FIG. 4 is a flowchart illustrating a specific example of Step S23 in FIG. 3.

FIG. 4 is a flowchart illustrating a specific example of Step S23 (determination of whether the predetermined condition is satisfied) in FIG. 3.

In the example of determination illustrated in this drawing, as the determination of whether the predetermined condition is satisfied, determiner 53 determines whether a block with the second largest area in the medical image out of the two or more blocks indicated by the block information has an area greater than or equal to the first threshold (S23a).

Figure 5:
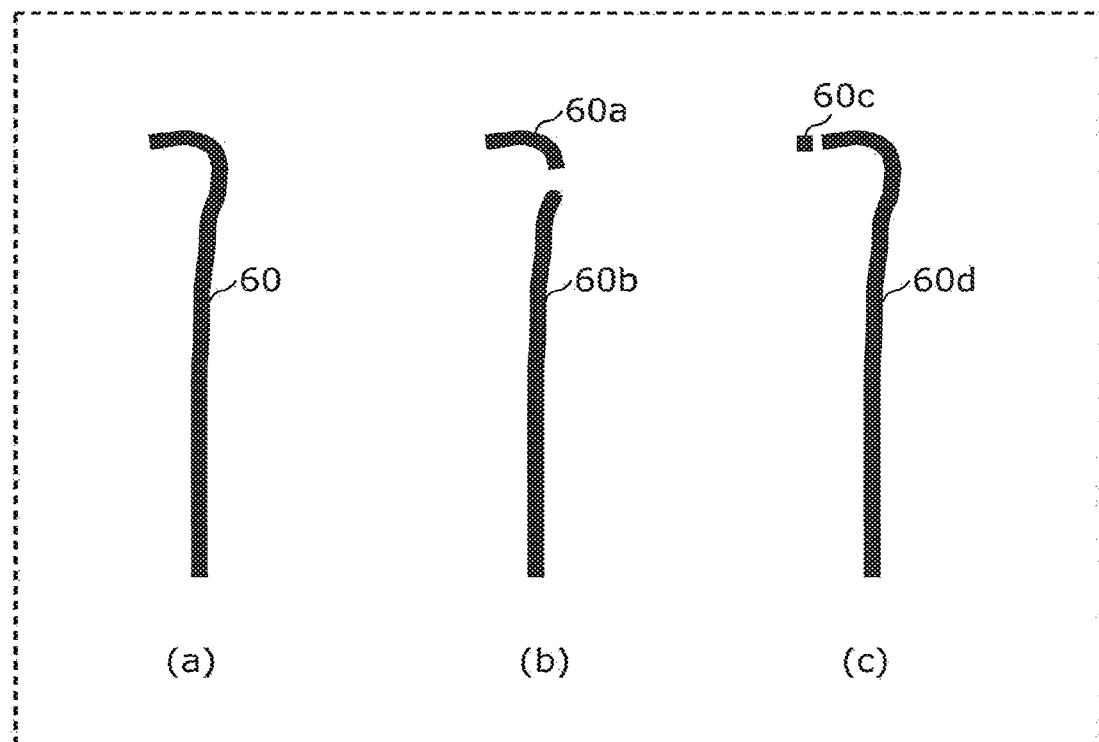
FIG. 5 is a schematic diagram illustrating an example of an anatomical structure in a medical image for explaining an example of results of determination illustrated in FIGS. 3 and 4.

In the case where the block with the second largest area in the medical image has an area greater than or equal to the first threshold (S23a: Yes), determiner 53 recognizes that the anatomical structure that is supposed to be detected as one block is separated into two or more blocks not because of noise on the image or image processing, and determines that the anatomical structure included in the medical image is abnormal (to S24 in FIG. 3), In the case where the block with the second largest area in the medical image does not have an area greater than or equal to the first threshold (S23a: No), determiner 53 recognizes that the anatomical structure that is supposed to be detected as one block is separated into two or more blocks because of noise on the image or image processing, and determines that the anatomical structure included in the medical image is not abnormal (to S22 in FIG. 3), FIG. 5 is a schematic diagram illustrating an example of an anatomical structure (descending aortic shadow in this example) in a medical image for explaining an example of results of determination illustrated in FIGS. 3 and 4. In more detail, (a) in FIG. 5 illustrates an example of the descending aortic shadow determined to be "not abnormal" as a result of the descending aortic shadow being detected as one block 60 (Step S21 in FIG. 3: Yes), (b) in FIG. 5 illustrates an example of the descending aortic shadow determined to be "abnormal" as a result of the descending aortic shadow being detected as two blocks 60a and 60b (Step S21 in FIG. 3: No) and second largest block 60a having an area greater than or equal to the first threshold (Step S23a in FIG. 4: Yes). (c) in FIG. 5 illustrates an example of the descending aortic shadow determined to be "not abnormal" as a result of the descending aortic shadow being detected as two blocks 60c and 60d (Step S21 in FIG. 3: No) but second largest block 60c not having an area greater than or equal to the first threshold (Step S23a in FIG. 4: No).

Figure 6:
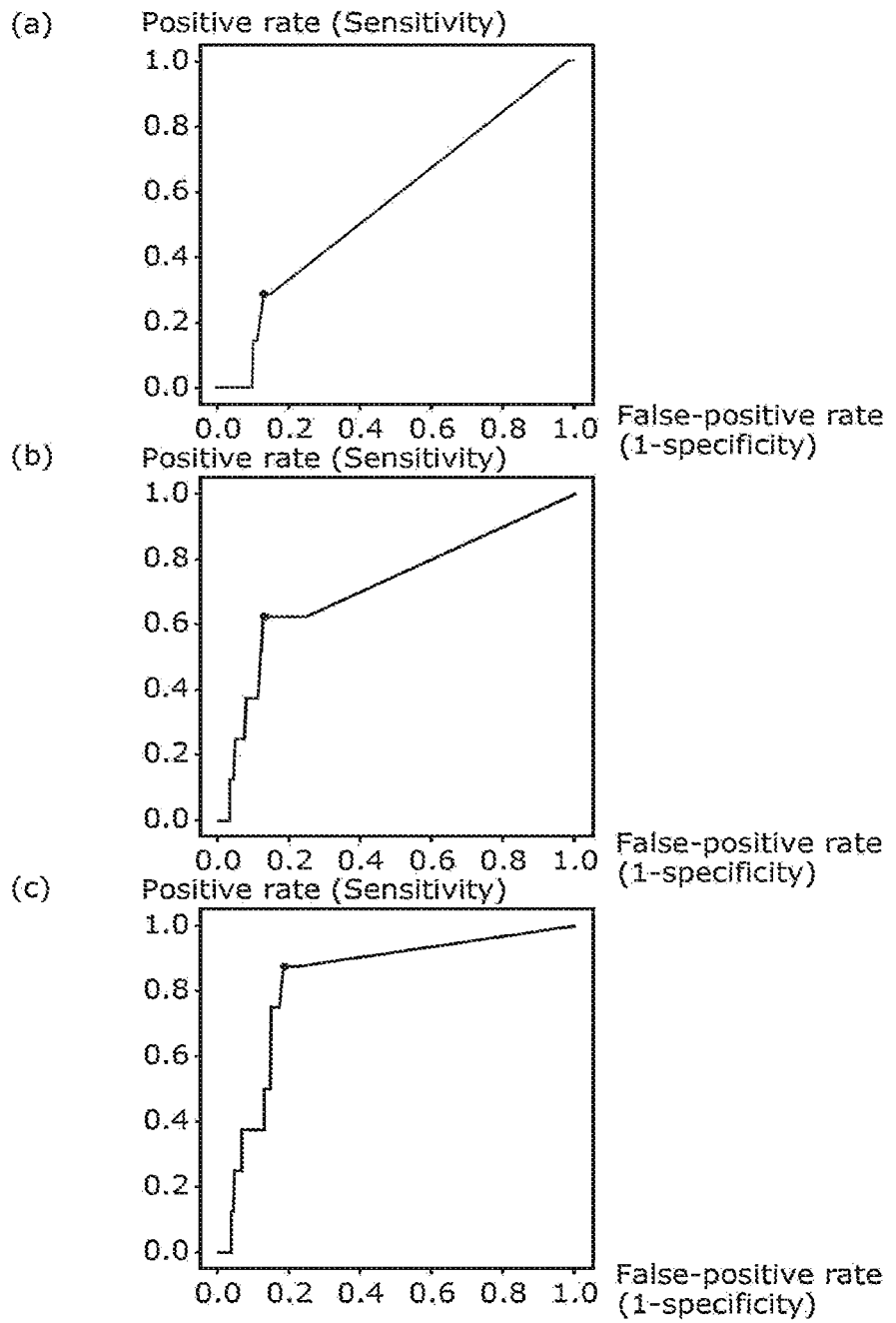
FIG. 6 is a diagram illustrating results of an experiment using cases for evaluating the determination illustrated in FIG. 4.

FIG. 6 is a diagram illustrating results of an experiment using cases for evaluating the determination illustrated in FIG. 4. In more detail, (a) in FIG. 6 illustrates a receiver operating characteristic (ROC) curve in the case of determining whether the right atrial shadow as an anatomical structure is abnormal. (b) in FIG. 6 illustrates a ROC curve in the case of determining whether the left ventricle shadow as an anatomical structure is abnormal, (c) in FIG. 6 illustrates a ROC curve in the case of determining whether the descending aortic shadow as an anatomical structure is abnormal. (d) in FIG. 6 illustrates the threshold selection result and the area under the curve (AUC) of the ROC curve illustrated in each of (a) to (c) in FIG. 6.

In the ROC curves illustrated in (a) to (c) in FIG. 6, the horizontal axis represents the false-positive rate (i.e. the probability that abnormality detection system 50 determined that a case known to be normal was abnormal (1-specificity)), and the vertical axis represents the positive rate (i.e. the probability that abnormality detection system 50 determined that a case known to be abnormal was abnormal (sensitivity)). In each of these ROC curves, determination results by abnormality detection system 50 obtained by changing the first threshold used for the determination illustrated in FIG. 4 are plotted for a plurality of cases known to be normal or abnormal.

When a ROC curve is a curve that passes a position closer to the upper left corner, cases are determined correctly. According to the inventors' comparison, the determination accuracy for cases relating to the left ventricle shadow illustrated in (b) in FIG. 6 and the determination accuracy for cases relating to the descending aortic shadow illustrated in (c) in FIG. 6 are better than the determination accuracy based on conventional image processing. This is considered to be because, with the method of determining abnormality/ normality for one anatomical structure based on the number of blocks extracted from a medical image and the size of a block with the second largest area, correct determination is possible even for cases that are difficult to be determined conventionally (for example, a case in which, in a medical image, an abnormality such as a tumor or water overlaps part of a normal structure of an organ). The first threshold corresponding to the point in the ROC curve closest to the upper left corner (the black point in each of (a) to (c) in FIG, 6) is regarded to be most suitable as the threshold used for the determination illustrated in FIG. 4.

There are several methods of selecting, in the ROC curve, the threshold used for the determination. One example is a method that selects a point (a black point in each of (a) to (c) in FIG. 6) at which the value of "positive rate+(1−false-positive rate)" is largest on the ROC curve. The value of "positive rate+(1−false-positive rate)" is called the Youden index, and the point at which the Youden index is maximum is selected. Other examples include a method that selects a point at which the positive rate is a target value (e.g. 0.9), and a method that selects a point at which the false-positive rate is a target value (e.g. 0.1).

Figure 7:
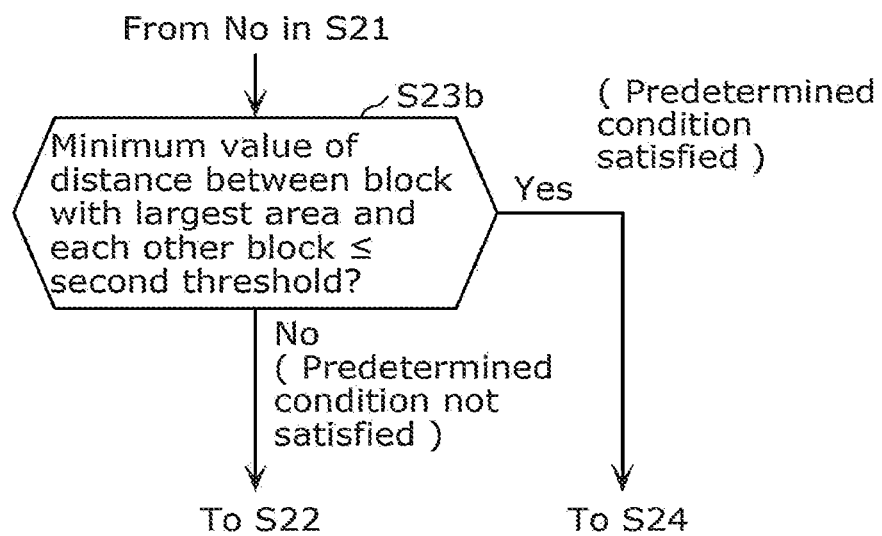
FIG. 7 is a flowchart illustrating another specific example of Step S23 in FIG. 3.

FIG. 7 is a flowchart illustrating another specific example of Step S23 (determination of whether the predetermined condition is satisfied) in FIG. 3.

In the example of determination illustrated in this drawing, as the determination of whether the predetermined condition is satisfied, determiner 53 determines whether the minimum value of the distance between a block with the largest area in the medical image and each other block out of the two or more blocks indicated by the block information is less than or equal to the second threshold (S23b).

In the case where the minimum value of the distance between the block with the largest area in the medical image and each other block is less than or equal to the second threshold (S23a: Yes), determiner 53 recognizes that the anatomical structure that is supposed to be detected as one block is separated into two or more blocks not because of noise on the image or image processing, and determines that the anatomical structure included in the medical image is abnormal (to S24 in FIG. 3).

In the case where the minimum value of the distance between the block with the largest area in the medical image and each other block is not less than or equal to the second threshold (S23b: No), determiner 53 recognizes that the anatomical structure that is supposed to be detected as one block is separated into two or more blocks because of noise on the image or image processing, and determines that the anatomical structure included in the medical image is not abnormal (to S22 in FIG. 3).

Figure 8A:
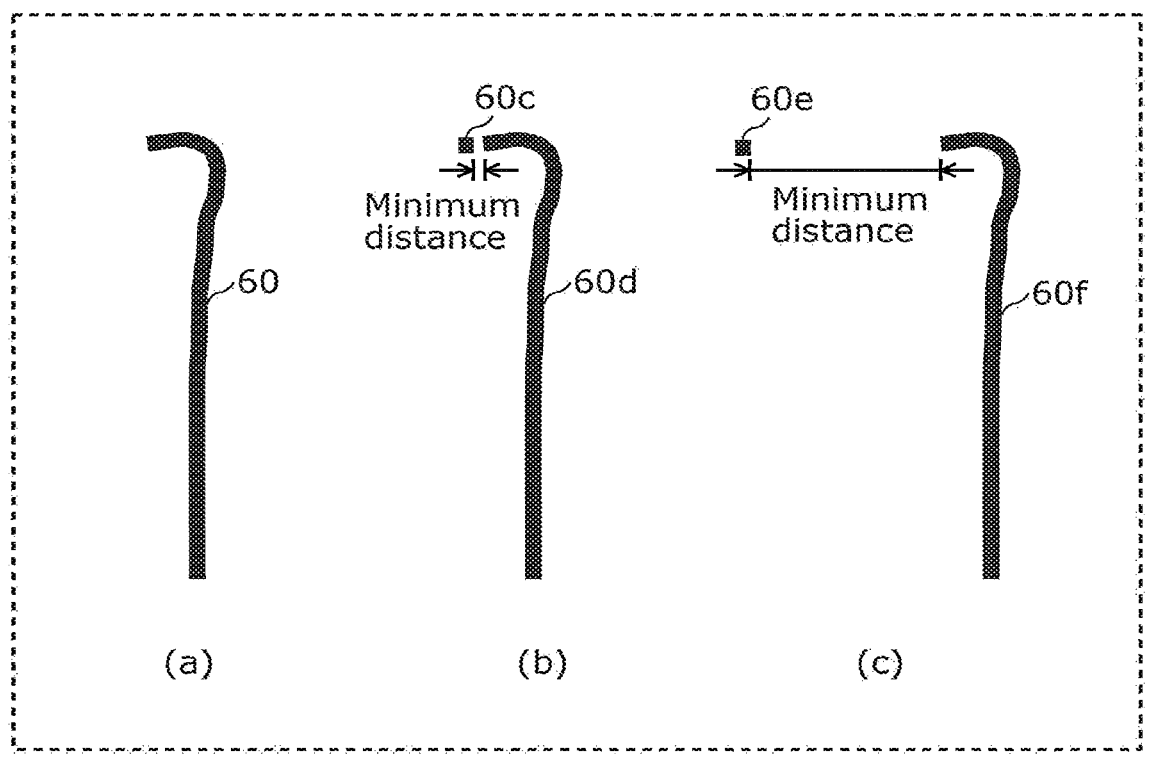
FIG. 8A is a schematic diagram illustrating an example of an anatomical structure in a medical image for explaining an example of results of determination illustrated in FIGS. 3 and 7.

FIG. 8A is a schematic diagram illustrating an example of an anatomical structure (descending aortic shadow in this example) in a medical image for explaining an example of results of determination illustrated in FIGS. 3 and 7. In more detail, (a) in FIG. 8A illustrates an example of the descending aortic shadow determined to be "not abnormal" as a result of the descending aortic shadow being detected as one block 60 (Step S21 in FIG. 3: Yes). (b) in FIG. 8A illustrates an example of the descending aortic shadow determined to be "abnormal" as a result of the descending aortic shadow being detected as two blocks 60c and 60d (Step S21 in FIG. 3: No) and the minimum value (the distance between blocks 60d and 60c in this example) of the distance in the medical image between block 60d with the largest area in the medical image and each other block (block 60c in this example) being less than or equal to the second threshold (Step S23b in FIG. 7: Yes). (c) in FIG. 8A illustrates an example of the descending aortic shadow determined to be "not abnormal" as a result of the descending aortic shadow being detected as two blocks 60e and 60f (Step S21 in FIG. 3: No) and the minimum value (the distance between blocks 60f and 60e in this example) of the distance in the medical image between block 60f with the largest area in the medical image and each other block (block 60e in this example) being not less than or equal to the second threshold (Step S23b in FIG. 7: No).

Figure 8B:
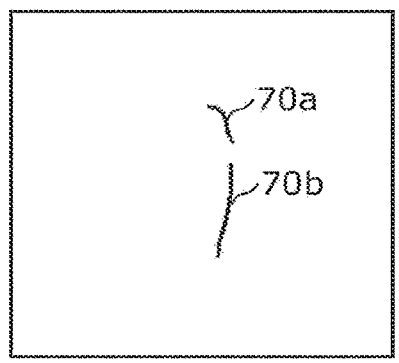
FIG. 8B is a diagram illustrating an imaging example of an anatomical structure in a medical image for explaining an example of results of determination illustrated in FIG. 7.
Figure 8B:
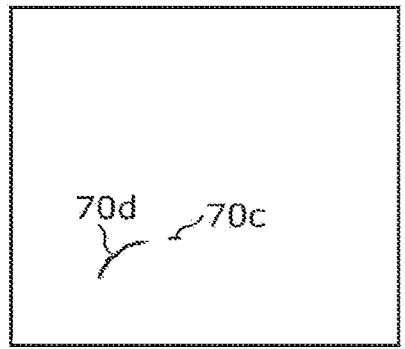
Figure 8B:
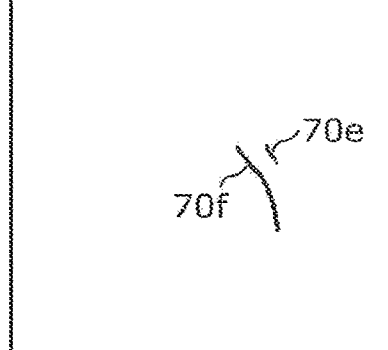
Figure 8B:
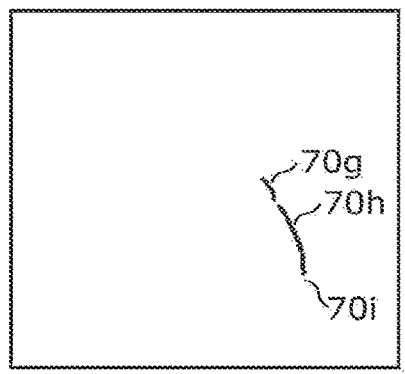

FIG. 83 is a diagram illustrating an actual imaging example of an anatomical structure (descending aortic shadow, etc. in this example) in a medical image for explaining an example of results of determination illustrated in FIG. 7. FIG. 8B illustrates an image of the descending aortic shadow, etc, actually extracted as one or more blocks, (a) to (c) in FIG. 8B each illustrate an example of the shadow correctly determined to be "not abnormal" as a result of the minimum value of the distance in the medical image between the block with the largest area in the medical image (70*b*, 70*d*, 70*f* in this example) and each other block (70*a*, 70*c*, 70*e* in this example) being not less than or equal to the second threshold (Step S23*b* in FIG. 7: No). (d) in FIG. 8*3* illustrates an example of the shadow correctly determined to be "abnormal" as a result of the minimum value of the distance in the medical image between the block with the largest area in the medical image (70*h* in this example) and each other block (70*g*, 70*i* in this example) being less than or equal to the second threshold (Step S23*b* in FIG. 7: No).

Specifically, blocks 70*a* and 70*b* illustrated in (a) in FIG. 8*13* are the result of detecting the descending aortic shadow, where the descending aortic shadow is determined to be "not abnormal" although it is discontinuous. Blocks 70*c* and 70*d* illustrated in (b) in FIG. 8B are the result of detecting the right diaphragmatic dome shadow, where the right diaphragmatic dome shadow is determined to be "not abnormal" although it is discontinuous. Blocks 70*e* and 70*f* illustrated in (c) in FIG. 8B are the result of detecting the left ventricle shadow, where the left ventricle shadow is determined to be "not abnormal" although it is discontinuous. Blocks 70*g*, 70*h*, and 70*i* illustrated in (d) in FIG. 8*3* are the result of detecting the left ventricle shadow, where the left ventricle shadow is determined to be "abnormal" because of its small discontinuities.

Figure 9:
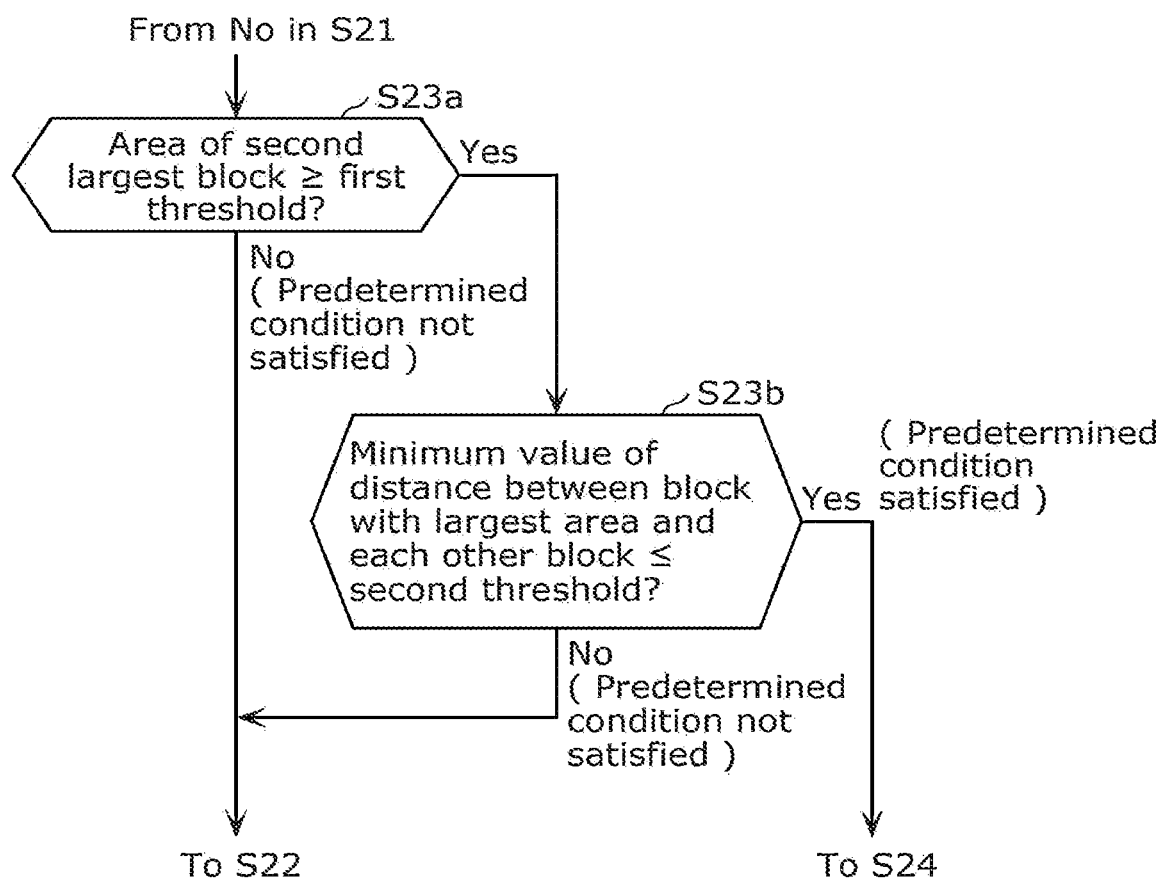
FIG. 9 is a flowchart illustrating another specific example of Step S23 in FIG. 3.

Step S23 (determination of whether the predetermined condition is satisfied) in FIG. 3 is not limited to the determination using areas illustrated in FIG. 4 and the determination using distances illustrated in FIG. 7. Step S23 may involve both the determination using areas and the determination using distances. FIG. 9 is a flowchart illustrating an example of using both the determination using areas and the determination using distances. FIG. 9 is a flowchart illustrating another specific example of Step S23 (determination of whether the predetermined condition is satisfied) in FIG. 3.

In the example of determination illustrated in this drawing, as the determination of whether the predetermined condition is satisfied, determiner 53 first determines whether a block with the second largest area in the medical image out of the two or more blocks indicated by the block information has an area greater than or equal to the first threshold (S23*a*).

In the case where the block with the second largest area in the medical image does not have an area greater than or equal to the first threshold (S23*a*: No), determiner 53 recognizes that the anatomical structure that is supposed to be detected as one block is separated into two or more blocks because of noise on the image or image processing, and determines that the anatomical structure included in the medical image is not abnormal (to S22 in FIG. 3).

In the case where the block with the second largest area in the medical image has an area greater than or equal to the first threshold (S23*a*: Yes), determiner 53 determines whether the minimum value of the distance between a block with the largest area in the medical image and each other block out of the two or more blocks indicated by the block information is less than or equal to the second threshold (S23*b*).

In the case where the minimum value of the distance between the block with the largest area in the medical image and each other block is less than or equal to the second threshold (S23*a*: Yes), determiner 53 recognizes that the anatomical structure that is supposed to be detected as one block is separated into two or more blocks not because of noise on the image or image processing, and determines that the anatomical structure included in the medical image is abnormal (to S24 in FIG. 3), In the case where the minimum value of the distance between the block with the largest area in the medical image and each other block is not less than or equal to the second threshold (S23*b*: No), determiner 53 recognizes that the anatomical structure that is supposed to be detected as one block is separated into two or more blocks because of noise on the image or image processing, and determines that the anatomical structure included in the medical image is not abnormal (to S22 in FIG. 3), In the determination illustrated in FIG. 9, the anatomical structure included in the medical image is determined to be abnormal in the case where the area condition is satisfied (S23*a*: Yes) and the distance condition is satisfied (S23*b*: Yes), and determined to be not abnormal otherwise. Alternatively, the anatomical structure included in the medical image may be determined to be abnormal in the case where at least one of the area condition (S23*a*) and the distance condition (S23*b*) is satisfied, and determined to be not abnormal otherwise.

As a specific example of Step S23 (determination of whether the predetermined condition is satisfied) in FIG. 3, which of the determination examples illustrated in FIGS. 4, 7, 9, etc. is employed may be determined depending on the type of the anatomical structure, etc. by conducting experiments on cases that are known to be abnormal or normal in advance so that a determination method with the highest accuracy rate of abnormality/normality determination will be selected.

Figure 10A:
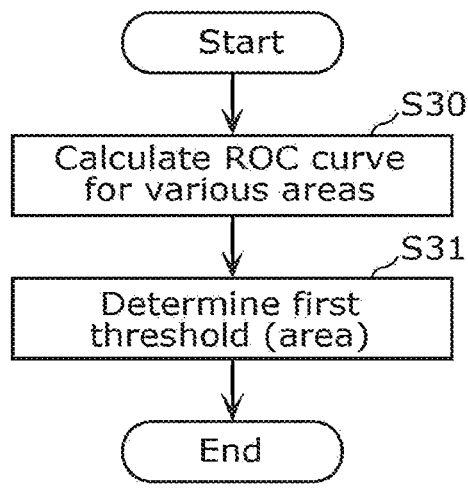
FIG. 10A is a flowchart illustrating a method of determining a first threshold used for determination using areas illustrated in FIG.

FIG. 10A is a flowchart illustrating a method of determining the first threshold used for the determination using areas illustrated in FIG. 4. In the determination using areas illustrated in FIG. 4, determiner 53 determines whether the block with the second largest area in the medical image out of the two or more blocks indicated by the block information has an area greater than or equal to the first threshold, as the determination of whether the predetermined condition is satisfied. The method of determining the first threshold used in such determination is as follows.

First, while changing the first threshold used for the determination illustrated in FIG. 4, abnormality detection system 50 performs determination for a plurality of cases that are each known to be normal or abnormal, thus generating a ROC curve as illustrated in (a) to (c) in FIG. 6 (S30). Next, in the calculated ROC curve, the first threshold corresponding to the point closest to the upper left corner is determined as the threshold used for the determination illustrated in FIG. 4 (S31).

In other words, provisional determination is performed in advance using various first thresholds, and the first threshold with the highest accuracy rate is employed as the determination threshold for an anatomical structure whose abnormality/normality is unknown. In this way, whether the anatomical structure is abnormal is detected with high accuracy.

Figure 10B:
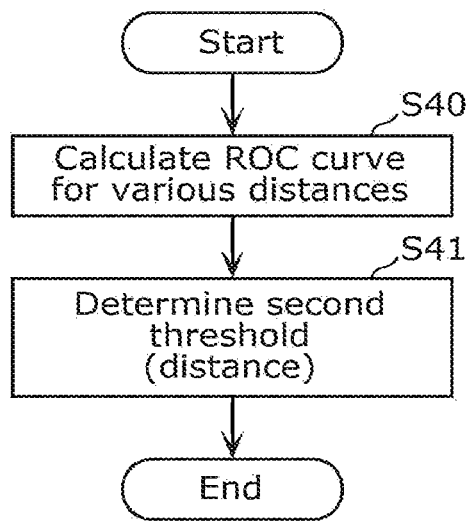
FIG. 10B is a flowchart illustrating a method of determining a second threshold used for determination using distances illustrated in FIG. 7.

FIG. 10B is a flowchart illustrating a method of determining the second threshold used for the determination using distances illustrated in FIG. 7. In the determination using distances illustrated in FIG. 7, determiner 53 determines whether the minimum value of the distance between the block with the largest area in the medical image and each other block out of the two or more blocks indicated by the block information is less than or equal to the second threshold, as the determination of whether the predetermined condition is satisfied. The method of determining the second threshold used in such determination is as follows.

First, while changing the second threshold used for the determination illustrated in FIG. 7, abnormality detection system 50 performs determination for a plurality of cases that are each known to be normal or abnormal, thus generating a ROC curve as illustrated in (a) to (c) in FIG. 6 (S40). Next, in the calculated ROC curve, the second threshold corresponding to the point closest to the upper left corner is determined as the threshold used for the determination illustrated in FIG. 7 (S41).

In other words, provisional determination is performed in advance using various second thresholds, and the second threshold with the highest accuracy rate is employed as the determination threshold for an anatomical structure whose abnormality/normality is unknown. In this way, whether the anatomical structure is abnormal is detected with high accuracy.

The method of determining the first threshold illustrated in FIG. 10A and the method of determining the second threshold illustrated in FIG. 10B can each be regarded as a step of obtaining a ROC curve for distinguishing between abnormality and normality of the anatomical structure and determining a predetermined condition (the first threshold and the second threshold in this example) based on the obtained ROC curve.

As described above, abnormality detection system 50 included in diagnosis support system according to this embodiment is a system that detects, based on a medical image, whether a prespecified anatomical structure included in the medical image is abnormal, and includes: obtainer 52 that obtains block information indicating one or more blocks that are each a region in which pixels representing the anatomical structure are connected in the medical image; and determiner 53 that determines and outputs whether the anatomical structure is abnormal, based on a total number of the one or more blocks indicated by the block information obtained by obtainer 52, wherein determiner 53 determines that the anatomical structure is not abnormal when the total number of the one or more blocks indicated by the block information is 1, and determines that the anatomical structure is abnormal when the total number of the one or more blocks indicated by the block information is 2 or more and the two or more blocks indicated by the block information satisfy a predetermined condition.

Thus, whether the anatomical structure is abnormal is determined based on whether the anatomical structure that is supposed to be detected as one block is detected as one block. Therefore, correct determination is possible even for cases that are difficult to be determined conventionally (for example, a case in which, in a medical image, an abnormality such as a tumor or water overlaps part of a normal structure of an organ). Whether the anatomical structure is abnormal can thus be detected with higher accuracy than conventional techniques.

As an example, the predetermined condition relates to a block with a second largest area in the medical image out of the two or more blocks indicated by the block information. In more detail, the predetermined condition is that the block with the second largest area in the medical image out of the two or more blocks indicated by the block information has an area greater than or equal to a first threshold.

Thus, the determination accuracy of determiner 53 is improved over the determination accuracy based on conventional image processing, as in the experimental results illustrated in (b) and (c) in FIG. 6.

The predetermined condition may be that a minimum value of a distance in the medical image between a block with a largest area in the medical image and each other block out of the two or more blocks indicated by the block information is less than or equal to a second threshold. The predetermined condition may further include a condition that a block with a second largest area in the medical image out of the two or more blocks indicated by the block information has an area greater than or equal to a first threshold.

Thus, whether the anatomical structure is abnormal is determined based on information of what kind of a plurality of blocks the anatomical structure that is supposed to be detected as one block is detected as. Therefore, correct determination is possible even for cases that are difficult to be determined conventionally.

The first threshold may be a value that depends on a receiver operating characteristic (ROC) curve for distinguishing between abnormality and normality of the anatomical structure, the ROC curve being obtained for various areas beforehand. Likewise, the second threshold may be a value that depends on a ROC curve for distinguishing between abnormality and normality of the anatomical structure, the ROC curve being obtained for various distances beforehand.

Thus, the first threshold and the second threshold are determined from the ROC curve obtained for cases that are each known to be normal or abnormal, so that whether the anatomical structure is abnormal can be detected with high accuracy.

An abnormality detection method according to this embodiment is an abnormality detection method executed by abnormality detection system 50 that detects, based on a medical image, whether a prespecified anatomical structure included in the medical image is abnormal, the abnormality detection method including: obtainment step S1 of obtaining block information indicating one or more blocks that are each a region in which pixels representing the anatomical structure are connected in the medical image; and determination step S2 of determining and outputting whether the anatomical structure is abnormal, based on a total number of the one or more blocks indicated by the block information obtained in obtainment step S1, wherein in determination step S2, the anatomical structure is determined to be not abnormal when the total number of the one or more blocks indicated by the block information is 1, and determined to be abnormal when the total number of the one or more blocks indicated by the block information is 2 or more and the two or more blocks indicated by the block information satisfy a predetermined condition.

Thus, whether the anatomical structure is abnormal is determined based on whether the anatomical structure that is supposed to be detected as one block is detected as one block. Therefore, correct determination is possible even for cases that are difficult to be determined conventionally (for example, a case in which, in a medical image, an abnormality such as a tumor or water overlaps part of a normal structure of an organ). Whether the anatomical structure is abnormal can thus be detected with higher accuracy than conventional techniques.

The abnormality detection method may further include: a step (S30 to S31, S40 to S41) of obtaining a ROC curve for distinguishing between abnormality and normality of the anatomical structure, and determining the predetermined condition based on the ROC curve obtained. Thus, the predetermined condition including the first threshold and the second threshold is determined from the ROC curve obtained for cases that are each known to be abnormal or normal, so that whether the anatomical structure is abnormal can be detected with high accuracy.

While the diagnosis support system and the medical image abnormality detection system and abnormality detection method according to the present disclosure have been described above by way of an embodiment, the present disclosure is not limited to the foregoing embodiment. Various modifications to the embodiments conceived by a person skilled in the art and other embodiments formed by combining structural elements in the embodiments without departing from the gist of the present disclosure are also included in the scope of the present disclosure.

For example, the presently disclosed technique can be implemented as a program for executing the steps included in the abnormality detection method in the foregoing embodiment, or as a computer-readable non-transitory recording medium such as a DVD on which the program is recorded. The program may be stored in one storage device, or stored in a plurality of storage devices in a distributed manner. The program may be executed by one computer, or executed by a plurality of computers connected via a communication channel in a distributed manner.

Although the abnormality detection method according to the foregoing embodiment includes the steps by obtainer 52 and determiner 53, the abnormality detection method is not limited to these steps, and may include at least one of the process by block information generator 51, image processor 54, and photographing device 20 and the process by viewer device 40.

The foregoing embodiment describes a plurality of determination examples as the predetermined condition. Abnormality detection system 50 may determine one of the plurality of determination examples based on an instruction from the user, or automatically determine and update a determination example with the highest accuracy rate in the past out of the plurality of determination examples according to the medical image or the type of anatomical structure.

Although the foregoing embodiment describes the case where the first threshold and the second threshold used for the predetermined condition are each set to the value corresponding to the point closest to the upper left corner in the ROC curve, the first threshold and the second threshold may each be set to another point close to the foregoing point, or selected from a plurality points close to the upper left corner by the user.

INDUSTRIAL APPLICABILITY

A medical image abnormality detection system and abnormality detection method according to the present disclosure be used as a system that detects whether an anatomical structure included in a medical image is abnormal, for example, a system that assists doctors in efficiently diagnose diseases,

The invention claimed is:

1. An abnormality detection system that detects, based on a medical image, whether a prespecified anatomical structure included in the medical image is abnormal, the abnormality detection system comprising:
an obtainer that obtains block information indicating one or more blocks that are each a region in which pixels representing the anatomical structure are connected in the medical image; and
a determiner that determines and outputs whether the anatomical structure is abnormal, based on a total number of the one or more blocks indicated by the block information obtained by the obtainer,
wherein the determiner determines that the anatomical structure is not abnormal when the total number of the one or more blocks indicated by the block information is 1, and determines that the anatomical structure is abnormal when the total number of the one or more blocks indicated by the block information is 2 or more and the two or more blocks indicated by the block information satisfy a predetermined condition,
the predetermined condition relates to a block with a second largest area in the medical image out of the two or more blocks indicated by the block information,
the predetermined condition is that the block with the second largest area in the medical image out of the two or more blocks indicated by the block information has an area greater than or equal to a first threshold, and
the first threshold is a value that depends on a receiver operating characteristic (ROC) curve for distinguishing between abnormality and normality of the anatomical structure, the ROC curve being obtained for various areas beforehand.

2. The abnormality detection system according to claim 1, wherein the predetermined condition is that a minimum value of a distance in the medical image between a block with a largest area in the medical image and each other block out of the two or more blocks indicated by the block information is less than or equal to a second threshold.

3. The abnormality detection system according to claim 2, wherein the predetermined condition further includes a condition that a block with a second largest area in the medical image out of the two or more blocks indicated by the block information has an area greater than or equal to a first threshold.

4. The abnormality detection system according to claim 2, wherein the second threshold is a value that depends on a ROC curve for distinguishing between abnormality and normality of the anatomical structure, the ROC curve being obtained for various distances beforehand.

5. An abnormality detection method executed by an abnormality detection system that detects, based on a medical image, whether a prespecified anatomical structure included in the medical image is abnormal, the abnormality detection method comprising:
obtaining block information indicating one or more blocks that are each a region in which pixels representing the anatomical structure are connected in the medical image; and
determining and outputting whether the anatomical structure is abnormal, based on a total number of the one or more blocks indicated by the block information obtained in the obtaining,
wherein in the determining, the anatomical structure is determined to be not abnormal when the total number of the one or more blocks indicated by the block information is 1, and determined to be abnormal when the total number of the one or more blocks indicated by the block information is 2 or more and the two or more blocks indicated by the block information satisfy a predetermined condition,
the predetermined condition relates to a block with a second largest area in the medical image out of the two or more blocks indicated by the block information,
the predetermined condition is that the block with the second largest area in the medical image out of the two or more blocks indicated by the block information has an area greater than or equal to a first threshold, and
the first threshold is a value that depends on a receiver operating characteristic (ROC) curve for distinguishing between abnormality and normality of the anatomical structure, the ROC curve being obtained for various areas beforehand.

6. The abnormality detection method according to claim 5, further comprising:
obtaining a ROC curve for distinguishing between abnormality and normality of the anatomical structure, and determining the predetermined condition based on the ROC curve obtained.

\* \* \* \* \*